United States Patent Office 3,641,171
Patented Feb. 8, 1972

3,641,171
ETHYLENE TELOMERIZATION
William W. Spooncer, Richmond, Calif., assignor to Shell Oil Company, New York, N.Y.
No Drawing. Filed June 11, 1969, Ser. No. 832,431
Int. Cl. C07c 17/00
U.S. Cl. 260—658 C                                 5 Claims

ABSTRACT OF THE DISCLOSURE

Ethylene and organic iodides are telomerized to higher-molecular-weight organic iodide products in the presence of a copper chelate of a β-diketone monoenolate.

BACKGROUND OF THE INVENTION

The telomerization of ethylene and alkyl halides is known in the art. This reaction involves the addition of ethylene, called a taxogen, to an alkyl halide, called a telogen, to produce a product, called a telomer, as depicted in the following Equation 1:

$$R-X + nCH_2=CH_2 \longrightarrow R-(CH_2CH_2)_n-X \quad (1)$$
TELOGEN   TAXOGEN                TELOMER wherein R—X represents an alkyl halide.

One telomerization process is that disclosed by U.S. 2,533,052 of Schmerling, issued Dec. 5, 1950, which involves the reaction of ethylene with alkyl chlorides to produce higher alkyl chloride telomer products in the presence of boron trifluoride as catalyst. This process, however, is useful only for incorporating only one or two ethylene moieties into the alkyl chloride reactant. Another type of telomerization process is free-radical initiated reactions between ethylene and alkyl iodides. One free-radical initiated telomerization process is that of Katsobashvili et al., Polymer Science (U.S.S.R.) 7, 908 (1965), wherein ethylene and ethyl iodide are telomerized in the presence of azobisisobutyronitrile as the free-radical initiator. The process of Katsobashvili produces telomer products which incorporate up to 5 ethylene moieties into the ethyl iodide reactant. However, the chemical free-radical initiator of the Katsobashvili process is consumed during the telomerization process, e.g., the azobisisobutyronitrile is decomposed into free-radical fragments which cannot be recovered for subsequent use. It would be of advantage, however, to produce high-molecular telomer products of ethylene and organic iodides by a catalytic process which does not involve the consumption of the catalyst initiator.

SUMMARY OF THE INVENTION

It has now been found that ethylene is telomerized with organic iodides to produce higher-molecular-weight organic iodide telomers in the presence of a salt of divalent copper and a β-dicarbonyl compound monoenolate chelating anion. By way of illustration, the telomerization of ethylene and ethyl iodide in the presence of copper acetylacetonate produces a telomer product mixture of even-carbon-number $C_4$-$C_{20}$ primary normal alkyl iodides.

DESCRIPTION OF PREFERRED EMBODIMENTS

The catalyst.—The telomerization catalyst comprises a copper chelate of a β-dicarbonylic compound monoenolate. β-Dicarbonylic compound monoenolate chelating ligands are characterized by the presence of within the molecular structure a moiety represented by the Formula I:

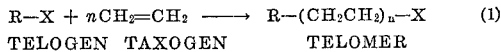

(I)

wherein the copper is bonded to the monovalent oxygen atom. It will be appreciated that within the copper chelate structure electron delocalization prevents complete description of the chelate by means of a single structure. One representative formula, however, is the following Formula II:

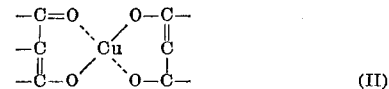

(II)

wherein the dotted lines represent interaction between the unshared electron pairs of the carbonylic oxygen and the vacant election orbitals of the copper.

In terms of the above Formula II the copper chelate is represented by the Formula III:

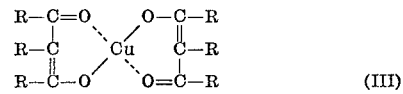

(III)

wherein R independently is hydrogen, alkyl or aryl of up to 10 carbon atoms. The chelating ligand preferably has up to 15 carbon atoms, but more preferably has up to 10 carbon atoms.

Illustrative of suitable copper chelates of the above Formula III are chelates derived from β-diketone monoenolates, e.g., bis(2,4 - pentandionato)copper(II), bis(1-phenyl - 1,3 - butandionato)copper(II), bis(3-ethyl - 2,4-pentandionato)copper(II), bis(1,5 - diphenyl - 2,4-pentandionato)copper(II), and bis(1,3-diphenyl - 1,3 - propandionato)copper(II). Bis(2,4 - pentanodionato)copper(II), more commonly referred to as copper acetylacetonate, is a preferred copper chelate catalyst.

The copper chelate catalyst is employed in amounts which are minor relative to the organic iodide reactant. Molar ratios of copper chelate catalyst to organic iodide reactant from about 1:10 to about 1:10,000 are satisfactory with molar ratios from about 1:20 to about 1:1000 being preferred.

The organic iodide reactant.—The process of the invention is generally applicable to any organic iodide compound of from 1 to 41 carbon atoms containing a non-tertiary iodide group attached to a saturated carbon atom in which the remaining valences of the carbon atom are satisfied by bonding to hydrogen or carbon atoms. By the term "saturated" carbon atom is meant a carbon atom whose valences are satisfied by single bonds, i.e., free from multiple unsaturation.

The organic iodide reactant is a hydrocarbon iodide compound containing only carbon and hydrogen other than the iodide groups or is a substituted-hydrocarbon iodide compound additionally containing non-interfering substituents.

One class of suitable iodide reactants is represented by the Formula IV:

(IV)

wherein R′ independently is hydrogen or an organo group of up to 20 carbon atoms, preferably of up to 10 carbon atoms, with the proviso that organo R′ groups are bonded to the carbon atom attached to the iodide group through a saturated carbon atom and with the further proviso that two organo R′ groups may together form a carbocyclic ring with 5 to 9 carbon atoms in the ring thereof.

The R′ groups are hydrocarbyl, that is, contain only atoms of carbon and hydrogen, or are substituted-hydrocarbyl containing, besides atoms of carbon and hydrogen, other atoms such as oxygen, nitrogen and halogen, particularly halogen of atomic number from 9 to 53 inclusive, which atoms are present in functional groups such as alkoxy, aryloxy, carboalkoxy, alkanoyl, alkanoyloxy, cyano, halo and like groups having no active hydrogen atoms. A preferred class of non-hydrocarbyl substituents are halogens of atomic number from 17 to 53 inclusive. It is appreciated, of course, that R groups containing iodo substituents on aliphatic saturated carbon atoms provide additional reactive sites for insertion of ethylene.

Illustrative of hydrocarbyl R groups are alkyl groups such as methyl, ethyl, propyl, isopropyl, butyl, pentyl, decyl, lauryl and stearyl; cycloalkyl groups such as cyclopropyl, cyclobutyl, cyclopentyl, cyclohexyl, methylcycloheptyl and cyclodecyl; alkenyl groups such as allyl, but-4-enyl, and dec-9-enyl; cycloalkenyl groups such as cyclopent-2-enyl, cyclohex-3-enyl, 4-methylcyclohex-2-enyl and cyclooct-3-enyl and cyclodec-5-enyl; alkynyl groups such as 2-propynyl, 3-butynyl and 5-decynyl; and aralkyl groups such as benzyl, 2-phenylethyl, 4-naphthylbutyl and 5-(p-totyl)hexyl.

Illustrative of substituted-hydrocarbyl R groups include substituted-alkyl groups such as fluoromethyl, chloromethyl, bromomethyl, iodomethyl, fluoroethyl, bromoethyl, iodoethyl, 3-iodopropyl, 4-chlorobutyl, 5-bromopentyl, 4-fluorohexyl, 6-iodooctyl, methoxymethyl, 3-phenoxypropyl, 4-carbethoxybutyl, 3-oxoheptyl, 8-acetoxyoctyl, and 10-cyanodecyl; substituted-cycloalkyl groups such as 2-fluorocyclopropyl, 3-iodocyclohexyl, 4-carbomethoxycyclobutyl, 3-methoxycycloheptyl, 4-benzyloxycyclohexyl, and 2-cyanocyclopentyl; substituted alkenyl groups such as 10-iododec-5-enyl, 4-cyanobut-2-enyl and 4-methoxyhept-6-enyl; substituted-cycloalkenyl such as 4-methoxycyclohex-2-enyl, 4-cyanocyclohex-2-enyl and 5-iodocyclohex-2-enyl; and substituted-aralkyl groups such as 4-chlorobenzyl, 2-(p-chlorophenyl)propyl, 4($\alpha$-cyanonaphthyl)pentyl and 5-(p-tolyl)-$\alpha$-chlorohexyl.

Exemplary iodide compounds of Formula IV therefore include hydrocarbyl monoiodides such as alkyl iodides, e.g., methyl iodided, ethyl iodide, propyl iodide, isopropyl iodide, n-butyl iodide, n-pentyl iodide, n-hexyl iodide, n-heptyl iodide, n-octyl iodide, n-decyl iodide and lauryl iodide; alkenyl iodides, e.g., but-3-enyl iodide, hex-5-enyl iodide, oct-7-enyl iodide and dec-6-enyl iodide; alkynyl iodides, e.g., 3-butynyl iodide and 8-octynyl iodide; cycloalkyl iodides, e.g., cyclopentyl iodide, cyclohexyl iodide, 4-methylcyclohexyl iodide, 4-cyclopropylbutyl iodide, and cyclodecyl iodide; cycloalkenyl iodides, e.g., 3-cyclohexenyl iodide and 4-cyclooctenyl iodide; bicyclic iodide compounds such as 2-iodobicyclo(3.3.0) octane, (dicyclohexyl)methyl iodide and (4-cyclohexyl)cyclohexyl iodide; and aralkyl iodides, e.g., 4-phenylbutyl iodide, 5-naphthylpentyl iodide and 4-phenylcyclohexyl iodide.

Exemplary iodide compounds of Formula IV containing substituted hydrocarbyl substituents are halohydrocarbons such as dihaloalkanes, e.g., 2-chloroethyl iodide, 3-fluoropropyl iodide, 1,3-diiodopropane, 4-dichlorobutyliodide, 1,4-diiodobutane, 5-bromopentyl iodide, 1,5-diiodopentane, 7-chloroheptyliodide, 10-bromodecyliodide, 1,16-diiodooctadecane, and 1,19-diiodononadecane; dihalocycloalkanes, e.g., 1,4-diiodocyclohexane, 4-chlorocyclohexyl iodide, 1,4-(iodomethyl)cyclohexane, and (3-chloromethyl)cyclohexyl iodide; and 4-(p-chlorophenylbutyl iodide; iodide compounds containing oxygen functional groups such as 4-methoxybutyl iodide, 5-phenoxyphenyl iodide, 6-carbethoxyhexyl iodide, 4-oxooctyliiodide, 10-acetoxydecyl iodide, 8-ethoxyoctadecyl iodide, 4-chlorocyclohex-2-enyl iodide, 5-(p-acetoxyphenyl)pentyl iodide and 16-acetoxyhexadec-4-enyl iodide; and iodide compounds containing cyano groups such as 5-cyanopentyl iodide, 4-cyanocyclohexyl iodide and 4-(p-cyanophenyl)butyl iodide.

In general, iodide compounds of Formula VI wherein the R' groups are saturated aliphatic, e.g., alkyl or halo-substituted-alkyl, are preferred over the R' groups containing carbon-carbon unsaturation, e.g., olefinic, acetylenic or aromatic unsaturation. Particularly preferred iodide compounds are those wherein one R group is hydrogen, e.g., primary saturated aliphatic iodides, and most preferred iodide compounds are lower (R' is n-alkyl of from 1 to 4 carbon atoms) primary normal alkyl monoiodides, especially ethyl iodide.

The molar ratio of organic iodide reactant to ethylene is not critical, although it is generally useful to employ an excess of ethylene. In general, molar ratios of organic iodide to ethylene of from about 1:1 to about 1:100 are satisfactory, with molar ratios from about 1:5 to about 1:20 being preferred. The ethylene is generally provided at initial pressures of from about 100 p.s.i.g. to 5000 p.s.i.g.

The reaction conditions.—The telomerization process is conducted in the liquid phase in the presence of a reaction diluent which is liquid at reaction temperature and pressure, is capable of dissolving the reactants and catalysts and is inert to the reactants, catalyst and the products produced therefrom. Suitable diluents are non-hydroxylic compounds such as hydrocarbons free from aliphatic unsaturation, e.g., hexane, heptane, octane, decane, dodecane, cyclohexane, tetrahydronaphthalene, benzene, toluene and xylene. Preferred reaction diluents comprise mononuclear aromatic hydrocarbons of from 6 to 12 carbon atoms. In certain modifications of the process, a portion of the telomer products suitably serves at least a portion of the reaction diluent and less or no added diluent is required. In most instances, however, added diluent is used and amounts of reaction diluent up to about 30 times the weight of organic iodide reactant are typically employed.

The telomerization process is conducted by any of a variety of procedures. In one modification, the ethylene, iodide reactant, catalyst and diluent are charged to an autoclave or similar pressure reactor for operation in a batchwise manner. In another modification, the process is effected in a continuous manner as by contacting the entire reaction mixture during passage through a tubular reactor. In still another modification, one reaction component is added to the other reaction components in increments, as by adding ethylene to a solution of the organic iodide reactant and catalyst. By any modification, the process is most efficiently conducted at elevated temperature and pressure. In general, temperatures varying from about 50° C. to about 250° C. are satisfactory with temperatures from about 75° C. to about 200° C. being preferred. Suitable reaction pressures are those which serve to maintain the reaction mixture substantially in the liquid phase. Reaction pressures from about 10 atmospheres to about 200 atmospheres in general are satisfactory. The telomerization process is suitably conducted in an inert reaction environment so that the presence of reactive materials such as water and oxygen is desirably avoided. Reaction conditions are therefore substantially anhydrous and substantially oxygen-free.

At the conclusion of the reaction, the product mixture is separated and the organic iodide product is recovered by conventional means such as fractional distillation, selective extraction, adsorption and the like.

In a particularly preferred embodiment of the process of the invention, the telomer product mixture from the telomerization reactor is separated into a higher organic iodide telomer fraction of a selected range of carbon atoms and a lower intermediate organic iodide fraction in a suitable fractionation unit or similar conventional separation apparatus. The intermediate organic iodide fraction along with any unreacted organic iodide is recycled to the telomerization reactor for further reaction with ethylene to produce additional higher organic iodide telomer products. The higher organic iodide fraction is recovered as product. The range of carbon atoms of the higher organic iodide tolemers can be any suitable range desired. Useful range of carbon atoms varies from 2 carbon-numbers to 10 carbon-numbers, e.g., $C_7$–$C_9$, $C_8$–$C_{12}$, $C_8$–$C_{14}$, $C_8$–$C_{18}$, $C_9$–$C_{11}$, $C_{11}$–$C_{15}$, $C_{15}$–$C_{21}$ and the like. The lower organic iodide fraction includes organic iodides of up to the carbon-number of the highest organic iodide in the higher organic iodide fraction, but preferably includes only organic iodides of up to the carbon-number of the lowest organic iodide in the higher organic iodide fraction.

The organic iodide telomer products.—According to the process of the invention ethylene moieties are added to organic iodides to produce higher-molecular-weight organic iodide products. By way of illustration the reaction of ethylene and the organic iodide represented by Formula IV is depicted in Equation 2:

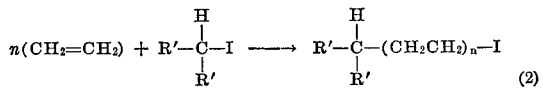

wherein $n$ represents the number of ethylene molecules inserted. Primary normal alkyl iodide reactants are converted to the corresponding linear higher-molecular-weight primary alkyl iodides.

The organic iodide products are materials of established utility. For example, the iodide products are converted to olefins and/or alcohols with aqueous base, e.g., sodium hydroxide. The product olefins are converted by conventional "Oxo" processes to aldehydes which are hydrogenated with conventional catalysts to the corresponding alcohols. The $C_{12}$–$C_{20}$ alcohol products are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

Example I

A 300 ml. stirred autoclave was charged with 0.7 g. of cupric acetylacetonate, 125 g. of benzene and 8 g. of n-heptane. The autoclave was pressured with ethylene such that the final pressure was 3520 p.s.i.g. at 151° C. A solution of 15.6 g. of ethyl iodide in 25 g. of benzene was added to the autoclave from an injection vessel maintained at the same pressure and temperature as the autoclave. The autoclave was heated between 147–150° for 18 hours during which the pressure dropped to 3350 p.s.i.g. Analysis of the reaction mixture showed a 45.5% conversion of ethyl iodide to a product mixture comprising 27.8 mole percent n-butyl iodide, 21.9 mole percent n-hexyl iodide, 15.9 mole percent n-octyl iodide, 12.0 mole percent n-decyl iodide, 8.6 mole percent n-dodecyl iodide, 6.1 mole percent n-tetradecyl iodide, 4.0 mole percent n-hexadecyl iodide, 2.5 mole percent n-octadecyl iodide and 1.1 mole percent n-eicosyl iodide.

Example II

A mixture of 0.12 g. of bis(1-phenyl-1,3-butandionato)copper(II), 3.1 g. of ethyl iodide, 20 g. of benzene and 1.6 g. of n-heptane was contacted in autoclave with 3250–3300 p.s.i.g. of ethylene at 205–210° C. for 16 hours by a procedure similar to that of Example I. Analysis of the reaction mixture showed a 55% conversion of ethyl iodide to a product mixture comprising $C_4$, $C_6$, $C_8$, $C_{10}$, $C_{12}$, $C_{14}$, $C_{16}$, $C_{18}$ and $C_{20}$ n-alkyl iodide telomers.

Example III

A mixture of 0.25 g. of bis(1,3-diphenyl-1,3-propandionato)copper(II), 3.12 g. of ethyl iodide, 25 g. of benzene and 1.6 g. of n-heptane was contacted in an autoclave with 3400–3500 p.s.i.g. of ethylene at 196–200° C. for 16 hours. Analysis of the reaction mixture showed a 30% conversion of ethyl iodide to a product mixture comprising $C_4$, $C_6$, $C_8$, $C_{10}$, $C_{12}$, $C_{14}$, $C_{16}$, $C_{18}$, $C_{20}$ and $C_{22}$ n-alkyl iodide telomers.

Example IV

By a procedure similar to that of Example I, cupric acetylacetone is employed as a catalyst for the telomerization of ethylene with each of the following organic iodides: cyclohexyl iodide, n-pentyl iodide, 1,5-diiodopentane, 4-cyanobutyliodide, and 4-acetoxybutyl iodide. A good yield of telomer products produced by the insertion of up to 10 ethylene moieties between the iodide-carbon bond is obtained with each organic iodide reactant.

I claim as my invention:

1. The process of telomerizing ethylene and organic iodides by contacting ethylene with an organic iodide represented by the formula:

wherein R' is independently hydrogen, alkyl of up to 10 carbon atoms or a halo-substituted alkyl of up to 10 carbon atoms in the presence of a copper chelate represented by the formula:

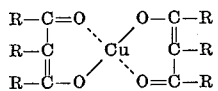

wherein R is independently hydrogen, alkyl of up to 10 carbon atoms, or aryl of up to 10 carbon atoms, in the liquid phase in an inert reaction diluent at a temperature of from about 50° to about 250° C.

2. The process of claim 1 wherein one R' group of the organic iodide is hydrogen.

3. The process of claim 2 wherein one R' group is n-alkyl of from 1 to 4 carbon atoms and one R' group is hydrogen.

4. The process of claim 3 wherein the copper chelate is copper acetylacetonate.

5. The process of claim 1 wherein the ethylene is provided at an initial pressure of 100 p.s.i.g. to 5000 p.s.i.g.

References Cited

UNITED STATES PATENTS

| | | | |
|---|---|---|---|
| 3,113,159 | 12/1963 | Hoffman et al. | 260—658 C X |
| 3,248,435 | 4/1966 | Schmerling | 260—648 X |
| 3,262,965 | 7/1966 | Janz | 260—465.3 X |
| 3,413,332 | 11/1968 | Schmerling | 260—491 X |

LEON ZITVER, Primary Examiner

J. A. BOSKA, Assistant Examiner

U.S. Cl. X.R.

260—648 R, 465.7, 491